United States Patent [19]

Horne et al.

[11] Patent Number: 5,356,606
[45] Date of Patent: Oct. 18, 1994

[54] PEROXIDIC COMPOSITIONS

[75] Inventors: Graham R. Horne, Rawtenstall, England; Nicholas A. Troughton, Brussels, Belgium

[73] Assignee: Solvay Interox Limited, Cheshire, England

[21] Appl. No.: 50,159

[22] PCT Filed: Sep. 17, 1991

[86] PCT No.: PCT/GB91/01589
§ 371 Date: Apr. 27, 1993
§ 102(e) Date: Apr. 27, 1993

[87] PCT Pub. No.: WO92/06036
PCT Pub. Date: Apr. 16, 1992

[30] Foreign Application Priority Data

Oct. 2, 1990 [GB] United Kingdom ............. 9021393.5

[51] Int. Cl.$^5$ .................... C01B 15/12; C01B 35/12
[52] U.S. Cl. .................... 423/265; 423/279; 423/281
[58] Field of Search .................... 423/265, 279, 281

[56] References Cited

U.S. PATENT DOCUMENTS

| | | | |
|---|---|---|---|
| 1,101,449 | 6/1914 | Kemmerich | 423/279 |
| 2,155,704 | 4/1939 | Goodall et al. | 423/279 |
| 3,960,888 | 6/1976 | Ploger et al. | 423/265 |
| 4,117,086 | 9/1978 | Ploger | 423/265 |
| 4,849,198 | 7/1989 | Ruhs | 423/268 |

FOREIGN PATENT DOCUMENTS

| | | |
|---|---|---|
| 0295384 | 12/1988 | European Pat. Off. . |
| 11210 | 1/1985 | Japan .................... 423/265 |
| 2188914 | 10/1987 | United Kingdom . |

OTHER PUBLICATIONS

World Patents Index Latest, Week 16, Derwent Publications Ltd., London, GB; AN 85-095250 & JP,A,60 042 206 (Nippon Peroxide K.K.) 6 Mar. 1985.

*Primary Examiner*—Wayne Langel
*Attorney, Agent, or Firm*—Larson and Taylor

[57] ABSTRACT

A composition having improved physical stability comprising an aqueous peroxidic solution of an alkali metal oxyboron compound containing alkali metal to boron in a substoichiometric mole ratio into which there has been introduced an effective stabilizing amount of cyclohexane -1,2-diaminotetra (methylene phosphonic acid) or a water soluble salt thereof. Also a process for enhancing the physical stability of an aqueous peroxidic solution of an alkali metal oxyboron compound containing alkali metal to boron in a substoichiometric mole ratio which is characterized by introducing into the solution an effective stabilizing amount of cyclohexane -1,2-diaminotetra (methylene phosphonic acid) or a water soluble salt thereof.

22 Claims, No Drawings

PEROXIDIC COMPOSITIONS

PEROXIDIC COMPOSITIONS

The present invention relates to peroxidic compositions and more particularly to compositions in liquid form which additionally contain an alkali metal oxyboron compound in which the alkali metal to boron mole ratio is substoichiometric.

Peroxid-Chemie GmbH, which is an Interox company, as is the present applicants, has been conducting research into aqueous peroxidic solutions containing an alkali metal oxyboron compound. They have prepared and identified a range of compositions which are particularly suitable for producing an alkali metal perborate in microcrystalline form in a subsequent process. In their compositions, the alkali metal to boron mole ratio is substoichiometric and preferably ranges from 0.33:1 to 0.67:1. Colloquially, the aqueous peroxidic compositions can be called perborate solutions, without implying which molecular structure for the species is present. They have also described subsequent processing steps in which alkali is introduced into their perborate solutions, preferably to attain an equivalent ratio of alkali to boron of about 0.9:1 to 1.1:1 and the resultant mixture is cooled.

The liquid perborate compositions described by Peroxid Chemie, and particularly within their preferred range, demonstrate an inherent degree of physical stability that is surprisingly good. However, extended trials on the liquid perborate solutions have shown that precipitation of a solid material can occur, especially after extended periods of storage. Precipitation is unwanted for a number of important reasons, but primarily because it denies to the customer of the composition the opportunity to obtain microcrystals in a controlled precipitation procedure. Premature crystallisation can also cause blockages in transportation lines or storage vessels.

Although it is feasible for the manufacturing process for the liquid perborate solutions to be followed with little delay by further processing, such as a controlled microcrystallisation process and the two processes to be conducted on the same site, it is often more convenient for the subsequent processing to be carried out by the customer rather than the manufacturer of the liquid perborate solutions. The various processing activities, in consequence, may be conducted at different locations that may be a long way apart. Multi-site procedures entail transportation of the liquid perborate solutions in bulk and can also entail their storage for extended periods of time, before, during and/or after transportation. The risk of precipitation can be exacerbated when the solutions are subject to the range of stresses, associated with the handling in bulk of chemicals, including temperature fluctuations and physical shaking. Consequently, it would be prudent to extend the safety margin for the compositions, i.e. enhance their physical stability, so that they are even better able to withstand the rigours of transportation and storage and resist for a longer period the threat of uncontrolled precipitation.

According to the present invention, there is provided a process for enhancing the physical stability of an aqueous peroxidic solution of an alkali metal oxyboron compound containing alkali metal to boron in a substoichiometric mole ratio which is characterised by introducing into the solution an effective amount of cyclohexane-1,2-diaminotetra(methylene phosphonic acid) or water soluble salt thereof.

In a second and closely related aspect of the present invention, there are compositions having enhanced physical stability comprising an aqueous peroxidic solution of an alkali metal oxyboron compound containing alkali metal to boron in a substoichiometric mole ratio into which there has introduced an effective amount of cyclohexane-1,2-diaminotetramethylene phosphonic acid) or water soluble salt thereof.

By the use of an effective amount of cyclohexane-1,2-diaminotetra(methylene phosphonic acid), often abbreviated herein to CDTMPA, in acid or salt form, it is possible to keep the aqueous solutions according to the invention for longer before solids precipitation occurs than with any other additive that was tested for this purpose. CDTMPA can also interact with peroxidic solutions in a way that converts it to a different but related and effective phosphonate compound to the extent and rate that depend upon a number of factors. For the avoidance of doubt, reference herein to the incorporation and content of CDTMPA herein includes a reference to the equivalent amount of a water soluble salt thereof, i.e. the related phosphonate compound, save where the context demands otherwise.

It is theorised that the impairment in physical stability of the solutions may be caused or exacerbated, at least in part, by impurities introduced in to solution with the principle reactants therein, and especially with the oxyboron compound. To some extent, therefore, the minimum amount of CDTMPA needed in solution to provide an effective amount is related to the extent of purity of the reactants employed. In view of the demonstrated effectiveness of CDTMPA in the invention compositions, the minimum effective concentration of CDTMPA in solution is extremely small, and indeed markedly lower than for chemically related compounds, i.e. compounds which contain a plurality of N-methylene phosphonic acid substituents, such as ethylene diaminotetra(methylene phosphonic acid) EDTMPA and diethylenetriaminopenta(methylene phosphonic acid), DTPMPA. In view of the cost of aminomethylene phosphonic acids as a class relative to the reagents, it will be recognised that such a technical advantage translates also to a commercial benefit.

For CDTMPA, it is possible to contemplate selecting a concentration as low as 0.005%, and effective concentrations have been observed within the range of from 0.01 to 1% w/w CDTMPA, %s herein being based on the total weight of the solution. Where a weight or concentration of any phosphonic acid is mentioned herein, it refers to the pure compound and not to the diluted product containing from 30 to 60% active ingredient which is normally supplied in commerce. It was also observed that for CDTMPA its effectiveness for the present purpose was seen to be little changed as its concentration was varied within the range of from about 0.01 to 0.1% w/w and thereafter, a tendency was observed for its effectiveness to become slowly but progressively lessened as the concentration was increased from 0.1% up to 1% w/w. Since the cost of an additive is directly proportional to its concentration, it is manifestly advantageous to employ a concentration at the lower end of the above-identified range, i.e. not more than about 0.5% w/w and especially from 0.01 to 0.1% w/w CDTMPA. In some tests its optimum effectiveness was found in the range of from about 0.01 to 0.05% w/w CDTMPA. A similar relationship was observed on the effectiveness of increased concentrations of DTPMPA but its optimum concentration was found the to be around 0.3% DTPMPA, i.e. at about 10 times the optimum concentration of CDTMPA. The relationship between amount of EDTMPA and its effectiveness was what might have been normally expected; i.e. it improved progressively as its concentration increased, but it was always the least effective amino phosphonate tested.

In comparison, both EDTMPA and DTPMPA were consistently found to be less effective for the invention purpose when employed at the same weight concentration as CDTMPA and even when employed in optimum amounts, were less effective than the especially preferred (and lower) range of CDTMPA.

The solutions having improved physical stability provided according to the present invention, often comprise solutions of alkali metal and oxyboron species described in the afore-mentioned copending application to Peroxid Chemie and in which the mole ratio of alkali metal to boron is selected in the range of from 0.33:1 to 0.67:1 and preferably in the range of from about 0.5:1 to 0.67:1. Although any alkali metal can be employed, it is usually sodium, either completely or mainly, in view of the widespread availability and relative cost of sodium to such alternatives as potassium or lithium. The oxyboron, calculated as boron, is normally present at a concentration of at least 1% w/w, preferably present at a concentration of from 3 to 8% w/w, and especially at a concentration within the range of from 5 to 7.5% w/w. The alkali metal and oxyboron species can be provided in solution together by dissolution of an alkali metal borate such as borax. Alternatively or additionally, the species can be provided wholly or partly using separate introductions of an alkali metal-rich compound such as an hydroxide or oxide and a boron-rich compound, such as boric acid and in particular ortho or meta boric acid. The solutions normally have a pH within the range of from pH4 to pH7, and in preferred solutions falls within the range of pH5 to pH6.

The aqueous peroxidic solutions contain active oxygen, avox, that is provided most conveniently in the form of hydrogen peroxide or alternatively a proportion can be provided as an alkali metal peroxide, subject to the constraint that the alkali metal:boron mole ratio does not exceed 0.67:1. Desirably, the avox is present in a mole ratio of avox:B of at least 0.8:1, particularly in the region of from 0.9:1 to 1.5:1 and especially up to about 1.2:1. Without being restricted to any particular theory, it is believed that at least a proportion of the avox is bound within one or more oxyboron species.

A particularly preferred stabilised aqueous peroxidic solution according to the present invention comprises a solution containing sodium, oxyborate species and active oxygen in a mole ratio of sodium:boron:avox of (0.55 to 0.65):1:(0.9 to 1.2), having a boron content of from 3 to 8% w/w and a pH of from pH5 to pH6 and containing an effective amount of CDTMPA, which is particularly selected in the range of from 0.01 to 0.1% w/w.

The stabilised peroxidic solutions of the present invention can be employed for the production of microcrystalline perborates.

Having described the invention in general terms, specific embodiments will now be described more fully by way of example only.

COMPARISONS C1 AND C2 AND EXAMPLES 3 TO 6

For these Comparisons and Example, a peroxidic sodium borate solution was made which contained the three components in a mole ratio of sodium:boron:avox of 0.64:1.0:1.0 and a boron content of 67.5 g/kg and an active oxygen content of 9.72% w/w. In Comparisons C1 and C2, respectively EDTMPA and DTPMPA (as specified hereinbefore) were mixed in with the peroxidic solution to provide amounts of respectively 0.1%, 0.3%, 0.5% and 1.0% w/w active ingredient in the solutions. The additives employed were obtained from Monsanto under their trade mark DEQUEST, grades 2046 and 2060s, respectively. In each of Examples 3 to 6, CDTMPA was likewise added to the solution in the active concentrations given in Table 1.

For each solution the heat output was measured at 40° C., because empirically it has been found that the physical storage stability of the solutions are inversely related to the heat output, and the results after 4 hours are listed in Table 1 below in the column designated LKB as microwatts/g of sample. Further samples (100 g) of each additive-containing solution were stored in vented polyethylene bottles (250 ml) in a dark chamber maintained at 32° C. The samples were periodically observed.

TABLE 1

| | Type | Additive Amount | LKB | Precipitation Time |
|---|---|---|---|---|
| C1a | EDTMPA | 0.1% | 175 | Between 39 and 53 days |
| b | " | 0.3% | 153 | " |
| c | | 0.5% | 138 | " |
| d | | 1.0% | 132 | " |
| C2a | DTPMPA | 0.1% | 94 | No sign of pptn (53 days) |
| b | " | 0.3% | 85 | " |
| c | | 0.5% | 95 | " |
| d | | 1.0% | 127 | Verging on pptn (53 days) |
| Ex3 | CDTMPA | 0.1% | 64 | No sign of pptn (53 days) |
| Ex4 | " | 0.3% | 73 | " |
| Ex5 | | 0.5% | 80 | " |
| Ex6 | | 1.0% | 96 | " |

From Table 1, it can be seen that there is a relationship between the LKB number and the time at which the products precipitate. Secondly, it can be seen that the products according to the Examples are superior to those of the two comparisons, using the same amount of additive, even though the additives used in the comparisons are probably the closest additives in chemical structure to the additive used in the Examples.

COMPARISONS C7 AND C8 AND EXAMPLE 9

For these Comparisons and Example, a peroxidic sodium borate solution was made which contained the three components in an approximate mole ratio of sodium:boron:avox of 0.64:1.0:1.0 and a boron content of 67.1 g/kg and an active oxygen content of 9.89% w/w. In Comparisons C7 no additive was employed and in C8 DTPMPA (DEQUEST 2060s) was mixed in with the peroxidic solution to provide 0.5% w/w active ingredient in the solution. In Example 9, CDTMPA was introduced at 0.5% w/w active ingredient. Samples of the solutions were stored in the same way as for Comparisons C1, C2 and Example 3. It was found that Comparison C7 suffered from crystalline precipitation by 27 days (which it should be recognised is still very good) and Comparison C8 likewise suffered precipitation within 63 days, whereas the product of Example 9 remained a clear solution after 63 days.

EXAMPLES 10 TO 14 AND COMPARISON C15

In these Examples and Comparison, a peroxidic sodium borate solution was made which contained the three components in an approximate mole ratio of sodium:boron:avox of 0.64:1.0:1.0, a boron content of 67.1 g/kg and an active oxygen content of 9.89% w/w.

In each of Examples 10 to 14, CDTMPA was added to the solution in the active concentrations given in Table 2, but no additive was employed in Comparison C15. For each solution the heat output was measured at 40° C., because it has been found empirically that the physical storage stability of the solutions is inversely related to the heat output. The results after 4 hours are listed in Table 2 below in the column designated LKB as microwatts/g of sample.

TABLE 2

|  | Type | Additive Amount | LKB |
|---|---|---|---|
| Ex10 | CDTMPA | 0.01% | 54 |
| Ex11 | " | 0.05% | 54 |
| Ex12 | " | 0.1% | 62 |
| Ex13 | " | 0.2% | 65 |
| Ex14 | " | 0.3% | 74 |
| C15 | — | — | 178 |

From Table 2, it can be seen that all the additions of CDTMPA enabled the resultant peroxidic solution to have much greater physical stability than if additive free and that the results obtained by adding CDTMPA in the range 0.01 to 0.05% were very similar.

We claim:

1. A process for enhancing the physical stability of an aqueous peroxidic solution of an alkali metal oxyboron compound containing alkali metal to boron in a substoichiometric mole ratio which is characterised by introducing into the solution an effective stabilizing amount of cyclohexane-1,2-diaminotetra(methylene phosphonic acid) or a water soluble salt thereof.

2. A process according to claim 1 characterised in that the amount of cyclohexane-1,2-diaminotetra(methylene phosphonic acid) introduced is at least 0.005% w/w based on the solution.

3. A process according to claim 2 characterised in that the amount of cyclohexane-1,2-diaminotetra(methylene phosphonic acid) introduced is selected in the range of from 0.01% w/w to 1% w/w based on the solution.

4. A process according to claim 3 characterised in that the amount of cyclohexane-1,2-diaminotetra(methylene phosphonic acid) introduced is selected in the range of from 0.01% w/w to 0.1% w/w based on the solution.

5. A process according to claim 1 characterised in that the alkali metal and oxyboron species are present in a mole ratio M:B of from 0.33:1 to 0.67:1.

6. A process according to claim 5 characterised in that the alkali metal and oxyboron species are present in a mole ratio M:B of from 0.5:1 to 0.67:1.

7. A process according to claim 1 characterised in that the oxyboron species are present at a concentration of from 3 to 8% w/w, calculated as boron.

8. A process according to claim 7 characterised in that the oxyboron species are present at a concentration of from 5 to 7.5% w/w, calculated as boron.

9. A process according to claim 1 characterised in that the solution contains available oxygen in a mole ratio to boron of at least 0.8:1.

10. A process according to claim 9 characterised in that the solution contains available oxygen in a mole ratio to boron of from 0.9:1 to 1.2:1.

11. A process according to claim 1 characterised in that the solution has a pH of from pH5 to pH6.

12. A composition having improved physical stability comprising an aqueous peroxidic solution of an alkali metal oxyboron compound containing alkali metal to boron in a substoichiometric mole ratio into which there has been introduced an effective stabilizing amount of cyclohexane-1,2-diamino-tetra(methylene phosphonic acid) or a water soluble salt thereof.

13. A composition according to claim 12 characterised in that the amount of cyclohexane-1,2-diaminotetra(methylene phosphonic acid) introduced is at least 0.005% w/w based on the solution.

14. A composition according to claim 2 characterised in that the amount of cyclohexane-1,2-diaminotetra(methylene phosphonic acid) introduced is selected in the range of from 0.01% w/w to 1% based on the solution.

15. A composition according to claim 14 characterised in that the amount of cyclohexane-1,2-diaminotetra(methylene phosphonic acid) introduced is selected in the range of from 0.01% w/w to 0.1% w/w based on the solution.

16. A composition according to claim 12 characterised in that the alkali metal and oxyboron species are present in a mole ratio M:B of from 0.33:1 to 0.67:1.

17. A composition according to claim 16 characterised in that the alkali metal and oxyboron species are present in a mole ratio M:B of from 0.5:1 to 0.67:1.

18. A composition according to claim 12 characterised in that the oxyboron species are present at a concentration of from 3 to 8% w/w, calculated as boron.

19. A composition according to claim 9 characterised in that the oxyboron species are present at a concentration of from 5 to 7.5% w/w, calculated as boron.

20. A composition according to claim 12 characterised in that the solution contains available oxygen in a mole ratio to boron of at least 0.8:1.

21. A composition according to claim 20 characterised in that the solution contains available oxygen in a mole ratio to boron of from 0.9:1 to 1.2:1.

22. A composition according to claim 12 characterised in that the solution has a pH of from pH5 to pH6.

* * * * *